(12) United States Patent
Ganiger et al.

(10) Patent No.: US 12,196,086 B2
(45) Date of Patent: Jan. 14, 2025

(54) SEAL FOR A GAS TURBINE ENGINE

(71) Applicant: General Electric Company, Schenectady, NY (US)

(72) Inventors: Ravindra Shankar Ganiger, Bangalore (IN); Anusrita Raychaudhuri, Bangalore (IN); Apostolos Karafillis, Winchester, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/962,243

(22) Filed: Oct. 7, 2022

(65) Prior Publication Data
US 2023/0212954 A1    Jul. 6, 2023

Related U.S. Application Data

(63) Continuation of application No. 16/673,293, filed on Nov. 4, 2019, now Pat. No. 11,466,583.

(51) Int. Cl.
*F01D 11/00* (2006.01)
*F16J 15/08* (2006.01)

(52) U.S. Cl.
CPC ......... *F01D 11/005* (2013.01); *F16J 15/0887* (2013.01); *F05D 2220/32* (2013.01); *F05D 2240/55* (2013.01)

(58) Field of Classification Search
CPC .... F16J 15/00; F16J 15/02; F16J 15/46; F16J 15/48; F16J 15/08; F16J 15/0887; F01D 11/00; F01D 11/003; F01D 11/005; F01D 11/006; F05D 2220/00; F05D 2220/32; F05D 2220/321; F05D 2220/3212–3213; F05D 2240/55 (2013.01)
(Continued)

(56) References Cited

U.S. PATENT DOCUMENTS

| 4,314,793 A | 2/1982 | DeTolla et al. |
| 4,854,600 A | 8/1989 | Halling et al. |

(Continued)

FOREIGN PATENT DOCUMENTS

| CA | 2642777 | 5/2010 |
| CN | 102733864 | 10/2012 |
| CN | 107035429 | 8/2017 |

OTHER PUBLICATIONS

United States Patent and Trademark Office, "Restriction Requirement," issued Jun. 1, 2021 in connection with U.S. Appl. No. 16/673,293, 7 pages.

(Continued)

*Primary Examiner* — Nathan Cumar (74) *Attorney, Agent, or Firm* — Hanley, Flight & Zimmerman, LLC (57) ABSTRACT

A sealing apparatus for a gas turbine engine includes: a first component; a second component positioned in proximity to the first component such that cavity is defined between the first and second components; a resilient seal disposed in the cavity so as to block gas flow between the first and second components, the resilient seal having a first contact surface contacting the first component and a second contact surface contacting the second component; and wherein the resilient seal is configured so as to produce a rolling movement in response to relative movement of the first and second components.

18 Claims, 10 Drawing Sheets

(58) Field of Classification Search
CPC .......... F05D 2220/3215–3219; F05D 2240/00;
F05D 2240/55
USPC ........................................................ 277/644
See application file for complete search history.

(56) References Cited

U.S. PATENT DOCUMENTS

| | | | |
|---|---|---|---|
| 6,182,755 | B1 | 2/2001 | Mansure |
| 6,431,555 | B1 | 8/2002 | Schroder et al. |
| 6,431,825 | B1 | 8/2002 | McLean |
| 6,568,903 | B1 | 5/2003 | Aksit et al. |
| 6,942,445 | B2 | 9/2005 | Morris et al. |
| 7,172,388 | B2 | 2/2007 | Synnott |
| 8,152,172 | B2 | 4/2012 | Halling |
| 8,651,497 | B2 | 2/2014 | Tholen et al. |
| 9,051,846 | B2 | 6/2015 | Arilla et al. |
| 9,708,922 | B1 | 7/2017 | Davis et al. |
| 10,794,204 | B2 | 10/2020 | Fitzpatrick et al. |
| 2005/0123389 | A1* | 6/2005 | Morris ................... F01D 11/10 415/1 |
| 2012/0263580 | A1 | 10/2012 | Shukla et al. |
| 2016/0084099 | A1 | 3/2016 | Davis et al. |
| 2016/0115807 | A1* | 4/2016 | Davis ................... F01D 11/005 277/592 |
| 2018/0017168 | A1* | 1/2018 | Davis ................... F01D 11/005 |
| 2021/0131298 | A1 | 5/2021 | Ganiger et al. |

OTHER PUBLICATIONS

United States Patent and Trademark Office, "Non-Final Office Action," issued Oct. 21, 2021 in connection with U.S. Appl. No. 16/673,293, 11 pages.

United States Patent and Trademark Office, "Final Office Action," issued Mar. 22, 2022 in connection with U.S. Appl. No. 16/673,293, 6 pages.

United States Patent and Trademark Office, "Notice of Allowance and Fee(s) Due," issued Jun. 8, 2022 in connection with U.S. Appl. No. 16/673,293, 8 pages.

Chinese National Intellectual Property Administration, "First Office Action," issued Jan. 24, 2024 in connection with Chinese Patent Application No. 202011209917.4, 9 pages, including partial English translation.

Chinese National Intellectual Property Administration, "Notice of Proceeding with Registration Formalities," issued May 31, 2024 in connection with Chinese Patent Application No. 202011209917.4, 6 pages, including partial English translation.

\* cited by examiner

SEAL FOR A GAS TURBINE ENGINE

RELATED APPLICATION

This patent arises from a continuation of U.S. patent application Ser. No. 16/673,293, filed on Nov. 4, 2019 and entitled "SEAL FOR A GAS TURBINE," which is incorporated herein by reference in its entirety.

BACKGROUND OF THE INVENTION

This invention relates generally to sealing in gas turbine engines, and more particularly relates to stationary seals in such engine.

A gas turbine engine includes numerous cavities between adjacent components which must be sealed to prevent leakage of gases from one area to another within the engine.

Frequently, the adjacent components can experience relative movement from a static position, for example as a result of thermal expansion. Typically, the cavities are sealed with resilient seals comprising relatively thin sheet material formed into a cross-sectional shape having one or more bends. This type of seal is spring-like and flexible and is able to deflect in response to movement of the components or to pressure loads so as to maintain ceiling contact. One known configuration of resilient seal has a W-shaped cross-section and is referred to as "W-seal".

Prior art resilient seals such as W-seals can experience failures such as cracking and fragmentation due to high temperatures and pressures combined with relative displacement of the adjacent components.

Accordingly, there is a need for resilient seal which can maintain structural and sealing integrity in the presence of thermal and pressure gradients.

BRIEF DESCRIPTION OF THE INVENTION

According to one aspect, this problem is addressed by a resilient seal which is shaped so that it can undergo a pivoting or rolling movement in response to thermal and pressure loads. This seal configuration can roll when compressed and hence reduce stresses.

According to one aspect of the technology described herein, a sealing apparatus for a gas turbine engine includes: a first component; a second component positioned in proximity to the first component such that cavity is defined between the first and second components; a resilient seal disposed in the cavity so as to block gas flow between the first and second components, the resilient seal having a first contact surface contacting the first component and a second contact surface contacting the second component; and wherein the resilient seal is configured so as to produce a rolling movement in response to relative movement of the first and second components.

According to another aspect of the technology described herein, a sealing apparatus for a gas turbine engine includes: a first component; a second component positioned in proximity to the first component such that cavity is defined between the first and second components, a resilient seal disposed in the cavity so as to block gas flow between the first and second components, the resilient seal having a first contact surface contacting the first component and a second contact surface contacting the second component; and wherein a damping element is bonded to the resilient seal.

According to another aspect of the technology described herein, a sealing apparatus for a gas turbine engine includes: a first component; a second component positioned in proximity to the first component such that cavity is defined between the first and second components, a resilient seal disposed in the cavity so as to block gas flow between the first and second components, the resilient seal having a first contact surface contacting the first component and a second contact surface contacting the second component, wherein the resilient seal includes: a first component which forms an annular ring with at least one split and includes first circumferential corrugations; and a second component part which forms a closed annular ring and includes second circumferential corrugations; wherein the first and second circumferential corrugations are nested together.

According to another aspect of the technology described herein, a sealing apparatus for a gas turbine engine includes: a first annular component; a second annular component positioned in proximity to the first annular component such that cavity is defined between the first and second components, a resilient seal disposed in the cavity so as to block gas flow between the first and second components, the resilient seal having a first contact surface contacting the first component and a second contact surface contacting the second component, wherein the resilient seal separates the cavity into first and second cavity portions, and includes a plurality of bends defining first and second chambers, wherein the first chamber communicates with the first portion of the cavity, the second chamber communicates with the second cavity portion, the first and second chambers are isolated from each other, and the chambers are shaped such that, for each chamber, substantially equal surface areas are facing the opposite cavity portions.

According to another aspect of the technology described herein, a sealing apparatus for a gas turbine engine includes: a first component; a second component positioned in proximity to the first component such that cavity is defined between the first and second components, a resilient seal disposed in the cavity so as to block gas flow between the first and second components, the resilient seal having a first contact surface contacting the first component and a second contact surface contacting the second component, wherein the resilient seal includes: a plurality of major bends defining two or more major legs interconnected by 180 degree bends; and a plurality of 180 degree minor bends within each major leg.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
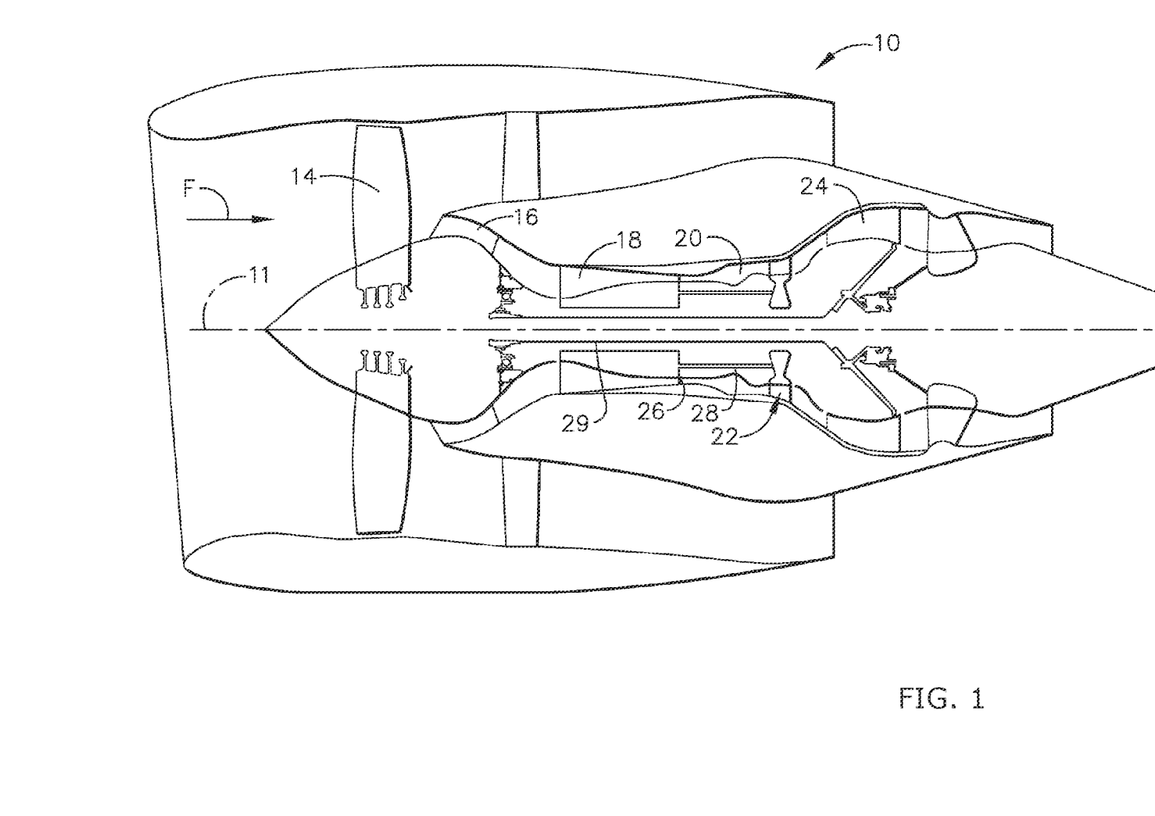
FIG. 1 is a cross-sectional, schematic view of an exemplary gas turbine engine.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines, such as low-bypass turbofans, turbojets, turboprops, etc., as well as turbine engines having any number of compressor-turbine spools. The engine 10 has a longitudinal center line or axis 11.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 14, booster 16, high-pressure compressor or "HPC" 18, combustor 20, high pressure turbine or "HPT" 22, and low-pressure turbine or "LPT" 24 arranged in serial flow relationship. In operation, pressurized air from an exit 26 of the compressor 18 is mixed with fuel in the combustor 20 and ignited, thereby generating combustion gases. Some work is extracted from these gases by the high-pressure turbine 22 which drives the compressor 18 via an outer shaft 28. The combustion gases then flow into the low-pressure turbine 24, which drives the fan 14 and booster 16 via an inner shaft 29.

Figure 2:
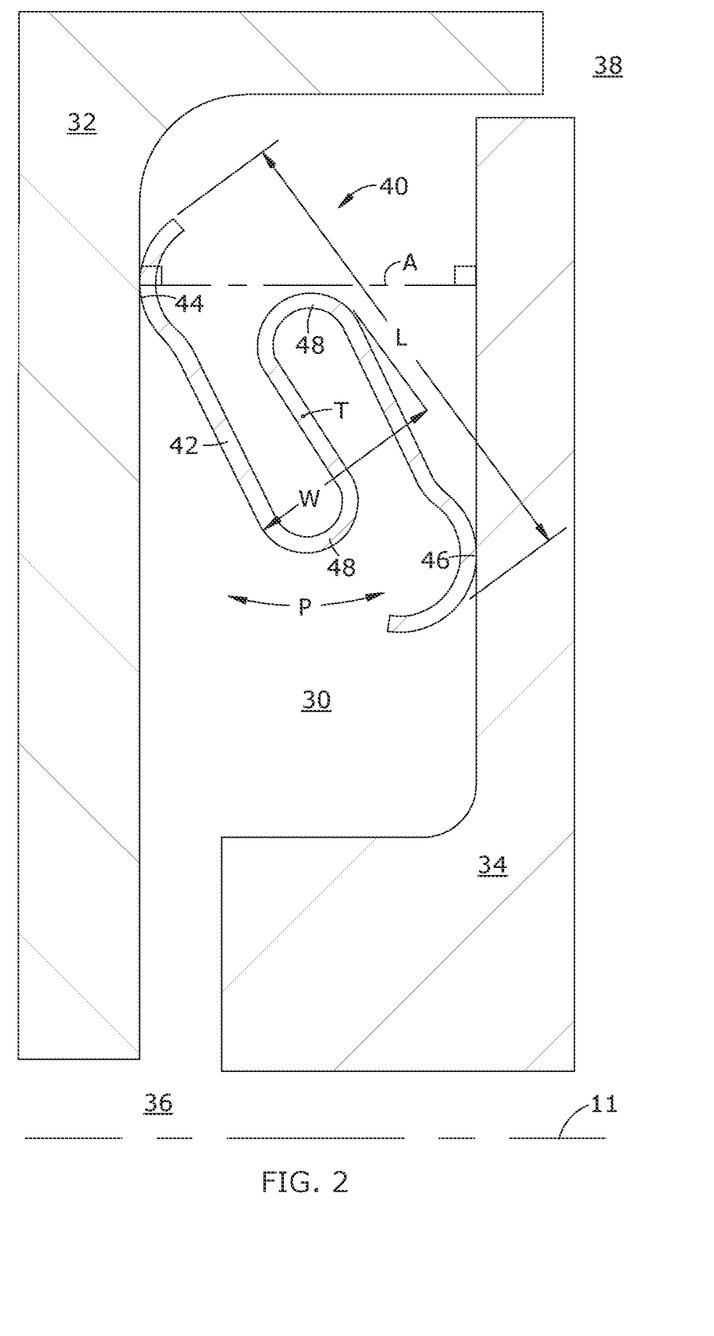
FIGS. 2-6 are schematic, half-sectional views of various embodiments of rolling seal assemblies.

The engine 10 includes within it numerous spaces, many of which are annular, defined by two or more components. Generally, the two components are non-rotating. The spaces are referred to herein as "cavities". FIG. 2 illustrates a representative cavity 30 defined between a first gas turbine engine component 32 and a second gas turbine engine component 34. The cavity 30 is subject to a gas pressure differential. There is a need and desire to prevent gas flow from passing between a first area 36 adjacent the cavity 30 and a second area 38 adjacent the cavity 30.

A resilient seal 40 is positioned in the cavity 30. The seal 40 has a body 42. The body 42 may be annular, for example it may be a body of revolution about centerline axis 11. The annular shape may be continuous or may include one or more splits. Alternatively, the seal 40 may be an arcuate or straight segment. In other words, its three-dimensional form may be the two-dimensional shape shown in FIG. 2 extruded along a linear axis or arc.

The seal has a first contact surface 44 defined by a convex-curve shape contacting the first component 32 and a second contact surface 46 defined by a convex-curve shape contacting the second component 34 to provide a sealing interface.

The seal 40 may be made from a thin, sheet-like material. Nonlimiting examples of suitable materials include aerospace alloys such as nickel-, cobalt-, or iron-based alloys. Optionally, the seal 40, or any of the other seals described herein, may be provided with a wear-resistant coating on some or all surfaces thereof.

The material properties of the seal 40 and its shape are configured to provide a resilient spring action which urges the first and second contact surfaces 44, 46 against the respective components. For example, the body 42 may include branches or legs interconnected by one or multiple bends 48. The example in FIG. 2 includes three branches or legs which are generally parallel to each other, interconnected by two bends 48 of approximately 180 degrees per bend.

The seal 40 is capable of resiliently deflecting in response to relative movement of the first and second components 32, 34 in order to maintain sealing contact. For example, if the two components 32, 34 move closer to each other, the seal 40 may compress (contact surfaces 44, 46 moving closer together), through bending deflection of one or more of the legs or bends 48.

Additionally, seal 40 has a cross-sectional shape which imparts the functional ability to pivot or "roll" in response to gas pressure loads and/or relative movement of the first and second components 32, 34. The pivoting or rolling movement occurs about an axis labeled "T", extending out of the page in FIG. 2. In the instance where the seal 40 is an annular structure revolved about an axis such as centerline axis 11, the axis T extends in the tangential direction relative to centerline axis 11. The direction of movement is illustrated by arrows labeled "P" in FIG. 2. This ability to roll greatly reduces stress in the seal 40 as compared to prior art seals, thus extending the life of the seal 40. The rolling capability of seal 40 or any other seal described herein may be facilitated by providing curved ends as shown in FIG. 2 (defining the contact surfaces 44, 46). The radii of curvature of the curved ends may be selected to tailor the contact pressure and flexural stresses in the seal 40 for a particular application.

As a general principle, the ability to effectively change overall dimension to span the cavity 30 by pivoting or rolling may be imparted by configuring the seal 40 such that its overall length "L" when viewed in section is different from its overall width "L" when viewed in section. Stated another way, an aspect ratio of the sectional dimensions may be other than 1:1.

As another general principle, the ability to effectively change overall dimension to span the cavity 30 by pivoting or rolling may be imparted by configuring the seal 40 such that the first and second contact surfaces 44, 46 are misaligned or offset relative to a direction of motion. In the example shown in FIG. 1, and anticipated direction of motion would generally be in the axial direction "A" or parallel to engine centerline axis 11. For example, this could occur in response to thermal expansion or contraction.

It can be seen that the contact surfaces 44, 46 are arranged such that a single line of action in direction A does not pass through both of the contact surfaces 44, 46. Direction A may be alternatively described as a line or axis oriented normal to the surfaces of both of the components 32, 34. The result is that a relative movement of first and second components 32, 34 parallel to direction A will result in a moment being imparted to the seal 40 causing pivoting or rolling shown by arrows P. This is in contrast to prior art configurations in which contacting contact surfaces would generally be aligned along a common line, causing the seal to deflect solely via compression or expansion.

Figure 3:
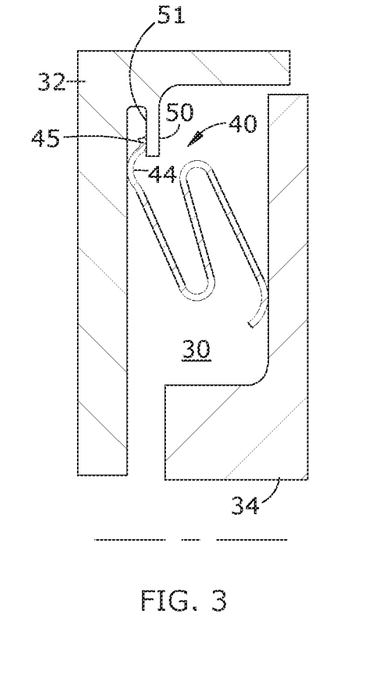

In the example shown in FIG. 2, the seal 40 may be described as having a "S" shape or a "G" shape. Numerous shapes and retention or mounting configurations are possible. FIG. 3 shows an example in which the first component 32 is provided with an integral hook 50 defining a slot 51 which receives a distal end of the seal 40 adjacent first contact surface 44, and retains the seal 40 in position. This may be necessary or desirable, for example, to make sure that the seal 40 remains in the cavity 30 even when the engine is not operating and no gas pressure differential is present.

Figure 4:
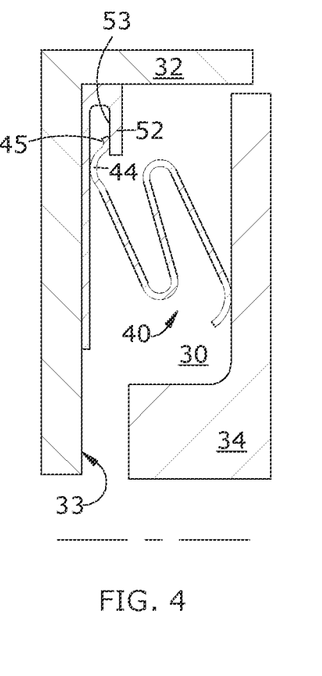

FIG. 4 shows an example in which the first component 32 is provided with a separate hook 52 abutting an axially-facing surface 33 of the first component 32. The separate hook 52 defines a slot 53 which receives a distal end 45 of the seal 40 adjacent the first contact surface 44, to retain the seal 40 in position.

Figure 5:
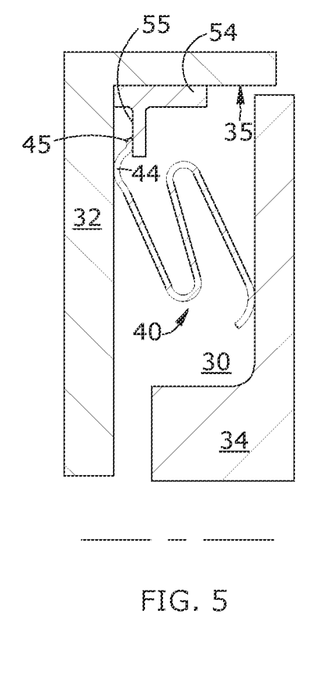

FIG. 5 shows an example in which the first component 32 is provided with an alternate separate hook 54 in the form of an annular body abutting a radially-facing surface 35 of the first component 32. It may be installed, for example, using a press-fit with the first component 32. The separate hook 54, in cooperation with first component 32, defines a slot 55 which receives a distal end 45 of the seal 40 adjacent the first contact surface 44, to retain the seal 40 in position.

Figure 6:
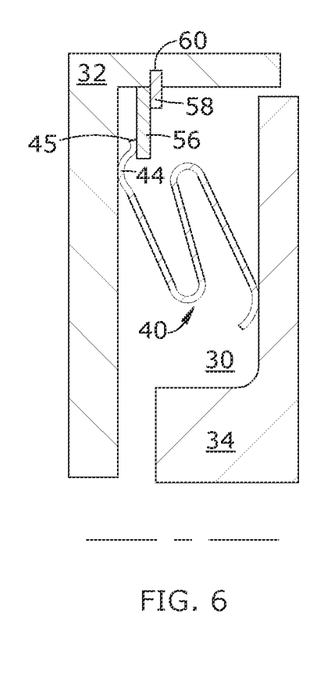

FIG. 6 shows an example in which the first component 32 is provided with a retainer plate 56 and snap ring 58 which engages a groove 60 in the first component 32. These components receive a distal end 45 of the seal 40 adjacent the first contact surface 44, to retain the seal 40 in position. The retainer plate 56 can be positioned either on the ID or OD of the seal 40 (i.e. either inboard or outboard), depending on the direction of the pressure gradient across the cavity 30, so that in operation the pressure gradient causes an increase in contact pressure on both ends of the seal 40. This concept is applicable for any of the seal variations utilizing a hook or retainer.

Figure 7:
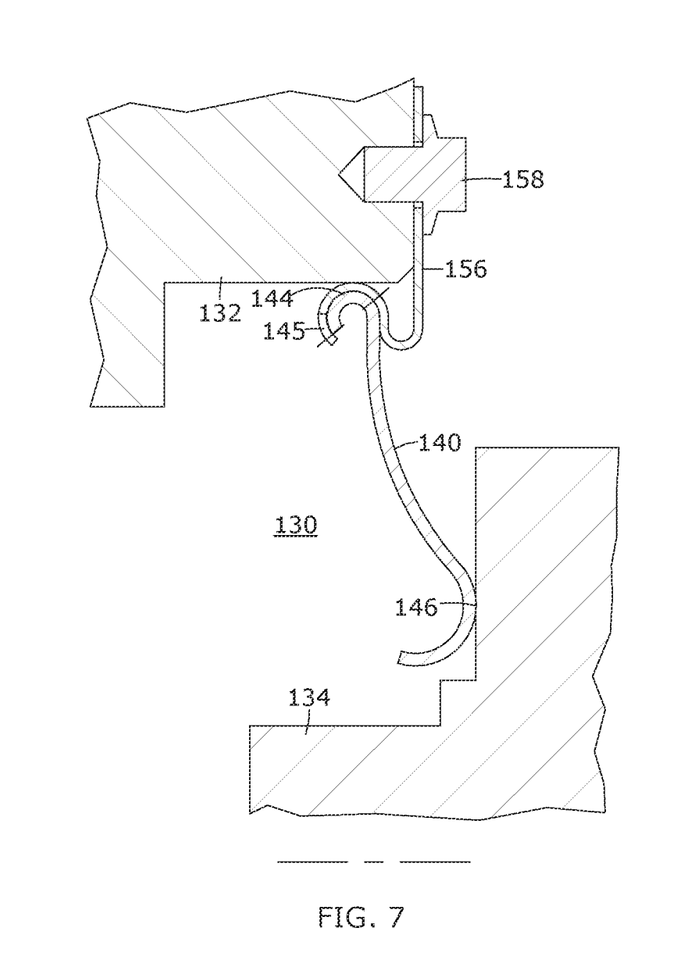
FIG. 7 is a schematic, half-sectional view of an alternative rolling seal assembly.

FIG. 7 shows a cavity 130 between first and second components 132, 134. The first component 132 includes a seal retainer 156 retained by fastener 158. The seal retainer 156 can have a clearance fit with the first component 132, or it can be piloted by a tight tolerance rabbet fit, as needed for a particular application. A resilient seal 140 having a flat "J" shape extends between the seal retainer 156 and second component 134. This may be referred to as a "J seal". The seal 140 has first and second contact surfaces 144, 146 which contact the retainer 156 and second component 134, respectively. This seal 140 has the ability to pivot or roll in response to gas pressure and/or thermal loads as described above for the seal 40. Optionally, as shown in FIG. 0.7, the seal may have at least one end curved back on itself and the seal retainer may curl around the end of the seal by more than 180°. This will prevent sliding of the seal relative to the retainer, and force any sliding movement to occur at the opposite end of the seal. Interrupted tabs (shown schematically at 145) may be used to form some portion of the curled retainer.

Figure 8:
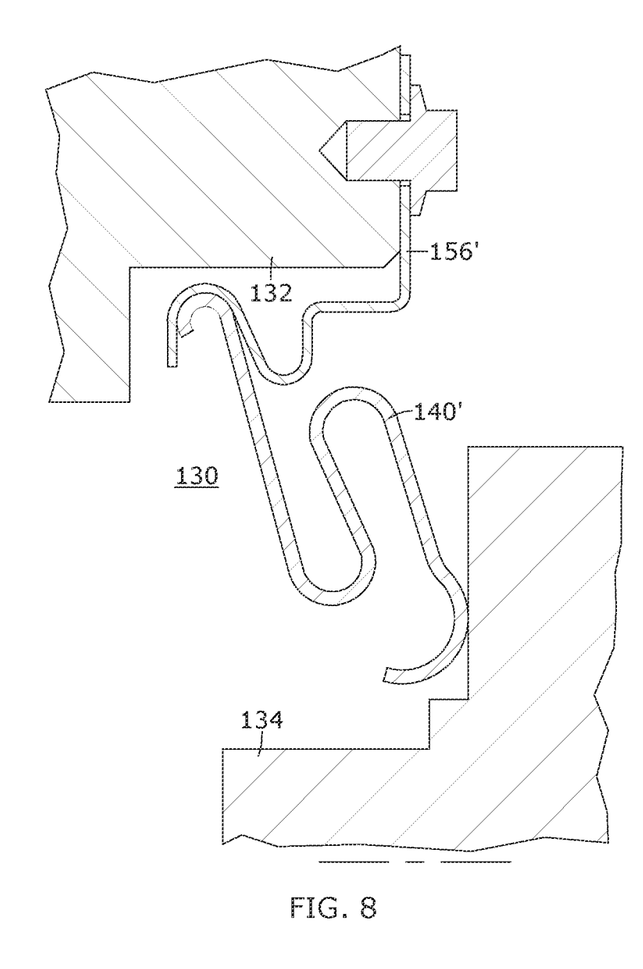
FIG. 8 is a schematic, half sectional view of an alternative rolling seal assembly.

FIG. 8 shows a variation of the cavity 130 shown in FIG. 7, with a retainer 156' and a seal 140' having a "S" shape.

Figure 9:
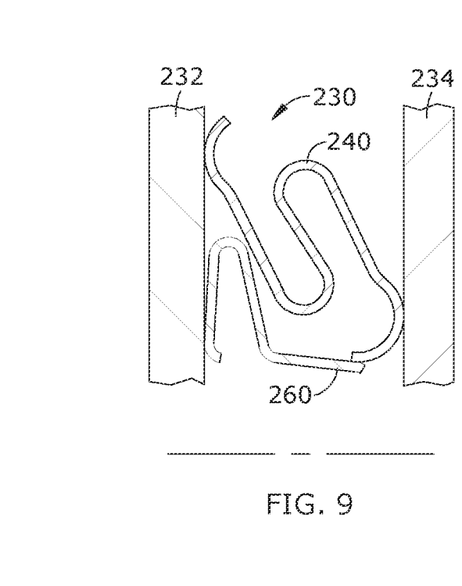
FIGS. 9-13 are schematic, half-sectional views of various embodiments of rolling seal assemblies including pressure deflectors.
Figure 10:
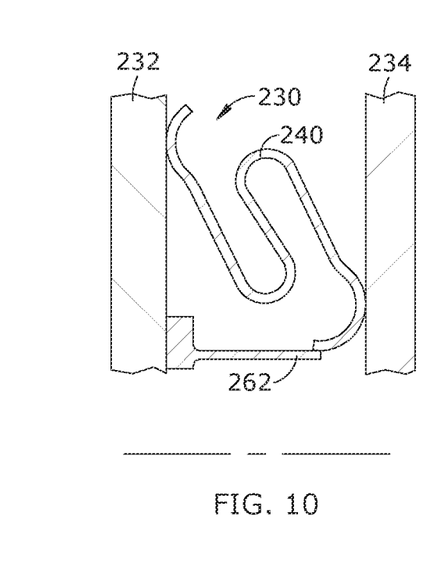
Figure 11:
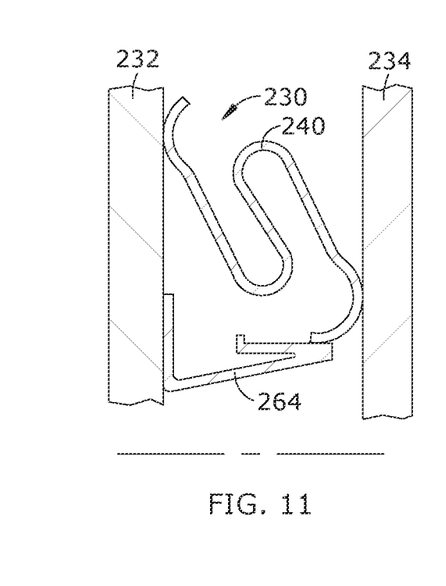

FIGS. 9-11 illustrate a cavity 230 disposed between first and second components 232, 234. A seal 240 similar to seal 40 described above is disposed between the first and second components 232, 234. A pressure deflector 260 is disposed between the first and second components 232, 234 adjacent the seal 240, and serves to reduce the pressure load impinging directly on the seal 240. FIGS. 10 and 11 show alternate embodiments 262, 264, respectively of the pressure deflector 260. In FIG. 10, the pressure deflector 262 has a "T" shape when viewed in section, and in FIG. 11, the pressure deflector 264 has an "L" shape when viewed in section.

Figure 12:
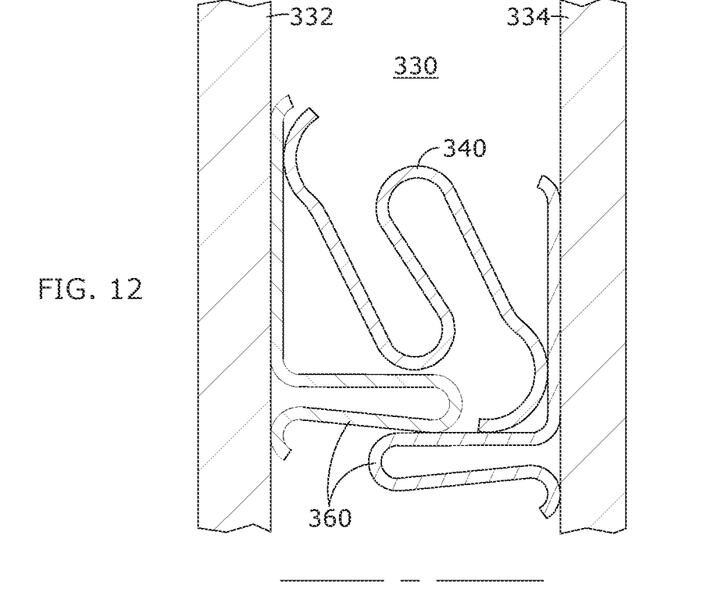

FIG. 12 illustrates a cavity 330 disposed between first and second components 332, 334. A seal 340 similar to seal 43 described above is disposed between the first and second components 332, 334. A pressure deflector comprising two pieces 360 is disposed between the first and second components 332, 334 adjacent the seal 340, and serves to reduce the pressure load impinging directly on the seal 340. In this example, each of the components 360 is formed of sheet material bent into an "L" shape and placed opposite to each other such that legs of the L shapes overlap.

Figure 13:
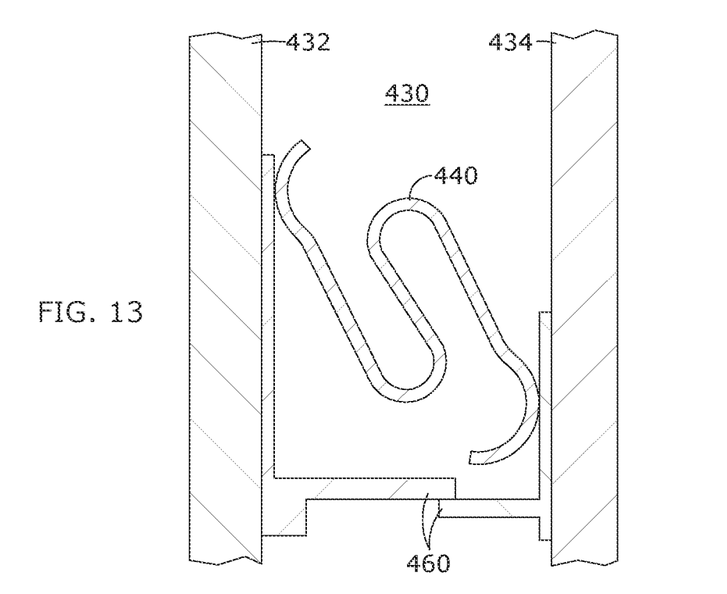

FIG. 13 illustrates a cavity 430 disposed between first and second components 432, 434. A seal 440 as described above is disposed between the first and second components 432, 434. A pressure deflector comprising two pieces 460 is disposed between the first and second components 432, 434 adjacent the seal 440, and serves to reduce the pressure load impinging directly on the seal 440. In this example, each of the components has a "T" shape and are placed opposite to each other such that legs of the T shapes overlap.

In addition to the pivoting or rolling movement describe above, a seal may be provided with other means to avoid excessive stress or breakage.

Figure 14:
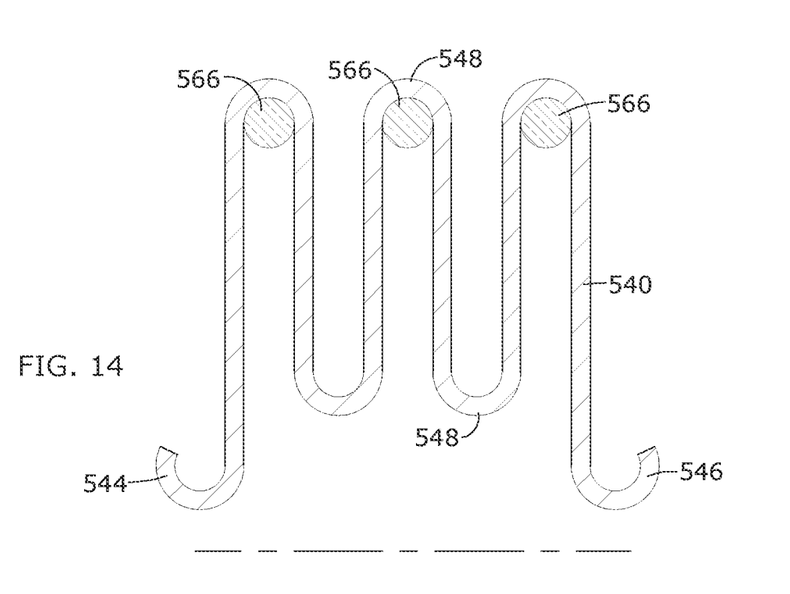
FIGS. 14 and 15 are schematic, half-sectional views of rolling seal assemblies including dampers.
Figure 15:
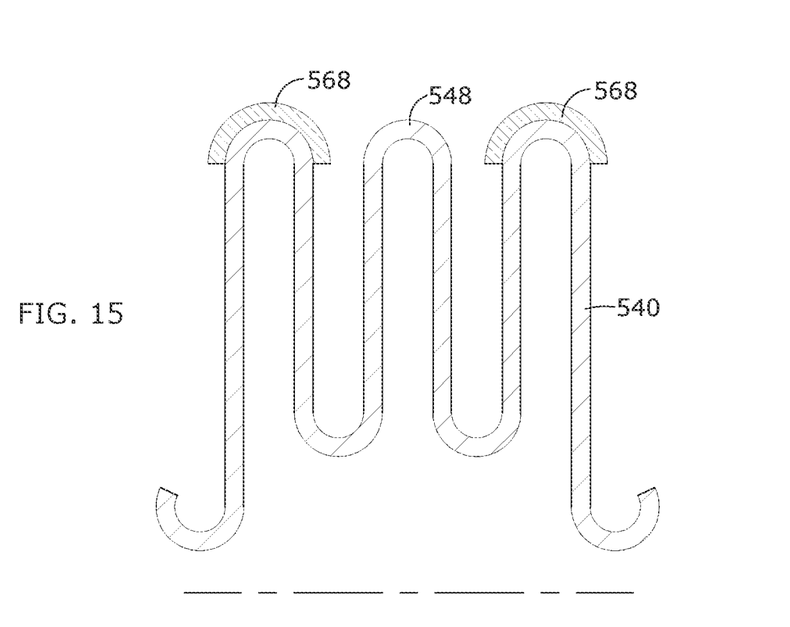

For example, FIGS. 14 and 15 illustrate a means by which a resilient seal may be provided with damping. FIG. 14 shows a resilient seal 540 with contact surfaces 544, 546 and including legs interconnected by a number of bends 548. The bends may turn through more than 90 degrees, for example 180 degrees. A damping member such as a rubber O-ring 566 is placed adjacent the inside of one or more of the bends 548. FIG. 14 shows the resilient seal 540 with a damping member such as a rubber U-ring 568 placed adjacent the outside of one or more of the bends 548. The damping member may be bonded to the resilient seal, for example by adhesive, by thermal bonding, or by molding directly to the resilient seal 540. One example of a suitable damping material is an elastomer.

Figure 16:
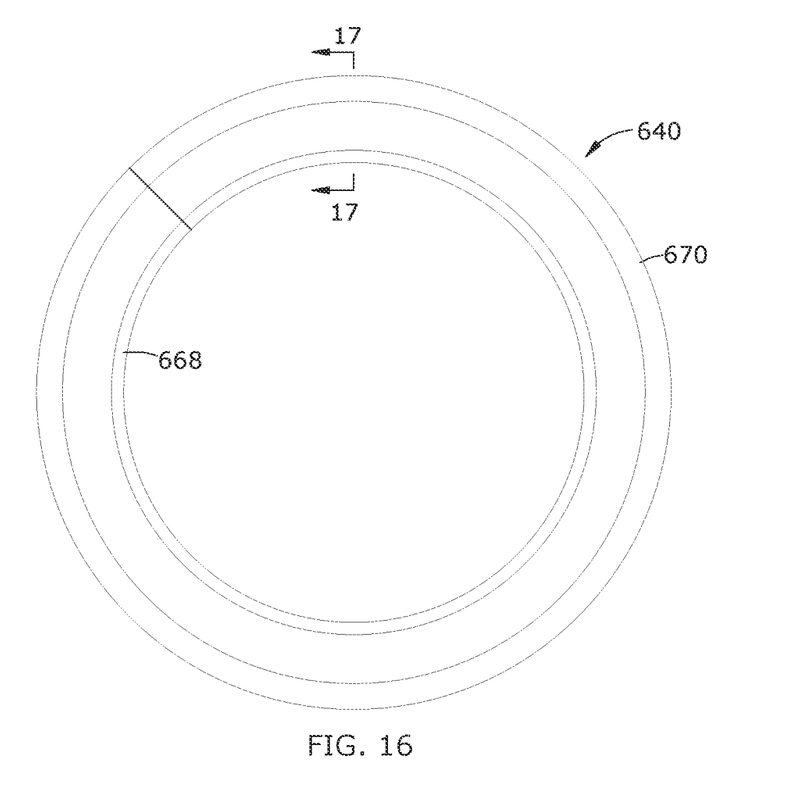
FIGS. 16 and 17 are schematic, front elevation and half-sectional views, respectively of two-piece rolling seal assemblies.
Figure 17:
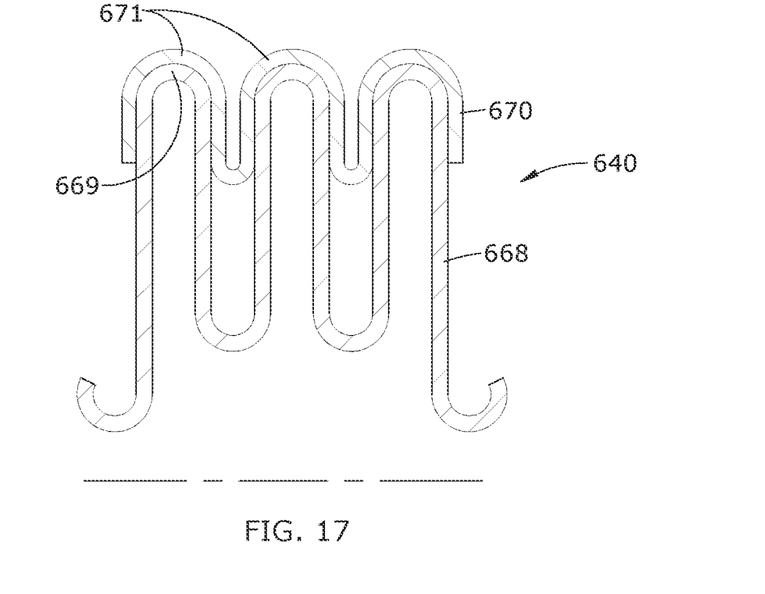

FIGS. 16 and 17 illustrate how a resilient seal 640 may be provided with gapless sealing around an annulus by providing two or more components. In the illustrated example a first component is an inner seal 668 which is an annular ring split at one location and includes circumferential corrugations 669. It is surrounded by an outer seal 670 which is continuous forming a closed annular ring and includes second circumferential corrugations 671. The inner and outer seals 668, 670 are positioned radially adjacent each other such that the first circumferential corrugations 669 are nested into the second circumferential corrugations 671.

Figure 18:
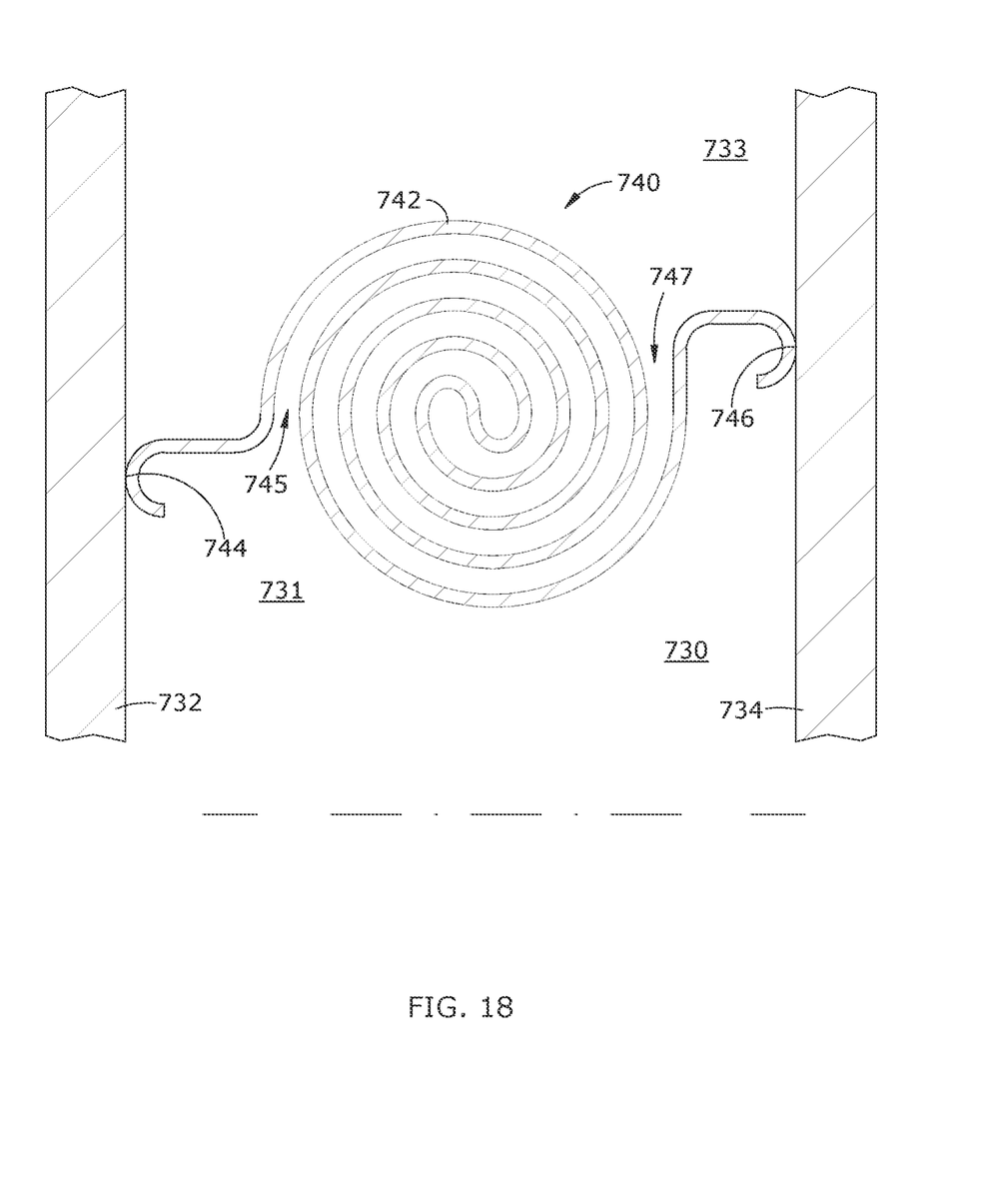
FIG. 18 is a schematic, half-sectional view of a balanced rolling seal assembly.

FIG. 18 illustrates a cavity 730 disposed between first and second components 732, 734. A resilient seal 740 is disposed in the cavity 740 and includes a first contact surface 744 abutting the first component 732 and a second contact surface 746 abutting the second component 734. The seal 740 includes a central portion 742 defining a spiral or coiled shape which defines first and second chambers 745, 747 that are isolated from each other. The first chamber 745 is in fluid communication with a first portion 731 of the cavity 730 which would be at a first gas pressure "P1" in operation. The second chamber 747 is in fluid communication with a second portion 733 of the cavity 730 which would be at a second gas pressure "P2" in operation, typically different from first gas pressure P1. Seal 740 isolates the cavity portions 731, 733 from each other. The chambers 745, 747 are shaped such that, for each chamber, substantially equal surface areas are facing the opposite cavity portions 731, 733. As a result, the seal 740 is self-balanced, that is, that gas pressure loads in opposite directions will be substantially equal even if the pressures P1 and P2 are different.

Figure 19:
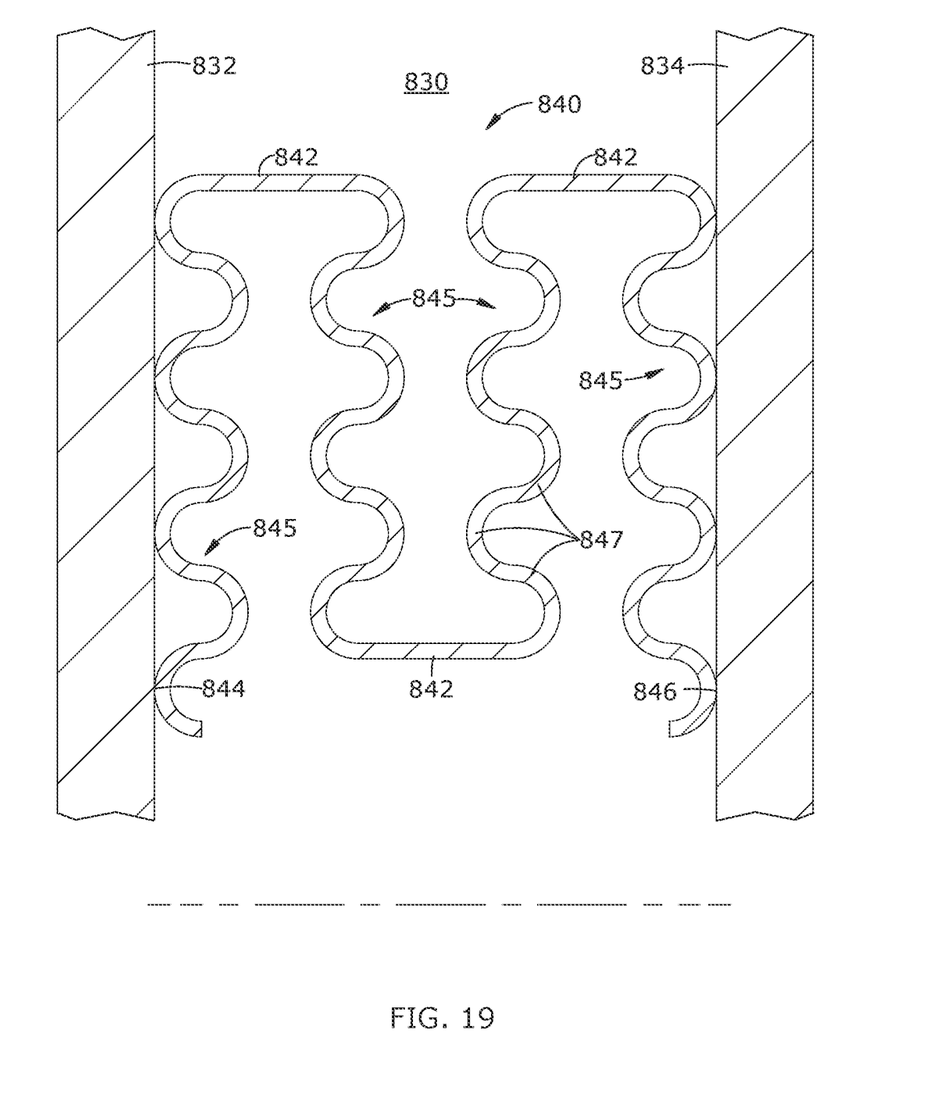
FIG. 19 is a schematic, half-sectional view of a seal assembly.

FIG. 19 illustrates a cavity 830 disposed between first and second components 832, 834. A resilient seal 840 is disposed in the cavity and includes a first contact surface 844 abutting the first component 834 and a second contact surface 846 abutting the second component 834. The seal 840 includes multiple recursive bends. In the specific example illustrated, the resilient seal includes a plurality of major bends 842 defining two or more major legs 845 interconnected by 180-degree bends; and a plurality of 180-degree minor bends 847 within each major leg 844. The provision of multiple major and minor bends reduces the bending deflection and stress at any given location of the seal 840, for a given total deflection.

The seals described herein have advantages over the prior art, namely increased service life. The rolling configuration, in particular, significantly reduces the stress on the seal thereby increasing life and SFC, and reliability. Furthermore, in the embodiments using a hook or retainer, the hook or retainer creates contact surfaces between the seal and hook or retainer where the contact pressure increases due to the pressure differentially applied across the seal, thereby enabling increased sealing capability at higher pressures.

The foregoing has described a seal apparatus for a gas turbine engine All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Further aspects of the invention are provided by the subject matter of the following numbered clauses:

1. A sealing apparatus for a gas turbine engine, comprising: a first component; a second component positioned in proximity to the first component such that cavity is defined between the first and second components; a resilient seal disposed in the cavity so as to block gas flow between the first and second components, the resilient seal having a first contact surface contacting the first component and a second contact surface contacting the second component; and wherein the resilient seal is configured so as to produce a rolling movement in response to relative movement of the first and second components.

2. The apparatus of any preceding clause wherein the first and second contact surfaces are offset relative to an axis mutually normal to facing surfaces of the first and second components.

3. The apparatus of any preceding clause wherein a sectional area of the resilient seal has an aspect ratio other than unity.

4. The apparatus of any preceding clause wherein the seal has an "S" shape.

5. The apparatus of any preceding clause wherein the seal has a "J" shape.

6. The apparatus of any preceding clause wherein the first and second contact surfaces are defined by convex-curved portions of the resilient seal.

7. The apparatus of any preceding clause wherein the first component includes a hook which receives a first end of the resilient seal.

8. The apparatus of any preceding clause wherein the hook is defined by a separate component which abuts a surface of the first component.

9. The apparatus of any preceding clause wherein:
a retainer is connected to the first component; and
the first contact surface of the resilient seal contacts the retainer.

10. The apparatus of any preceding clause wherein the retainer is curled around one end of the resilient seal by more than 180 degrees.

11. The apparatus of any preceding clause wherein a pressure deflector is disposed between the first and second components, adjacent the resilient seal.

12. The apparatus of any preceding clause wherein the pressure deflector defines an L-shape.

13. The apparatus of any preceding clause wherein the pressure deflector comprises two opposite-facing elements which overlap each other.

14. The apparatus of any preceding clause wherein the first and second components are annular components of a gas turbine engine.

15. The apparatus of any preceding clause wherein:
the first and second components are annular components of a gas turbine engine; and
the first and second components are substantially non-rotating relative to each other.

16. The apparatus of any preceding clause wherein the resilient seal comprises a metal alloy.

17. A sealing apparatus for a gas turbine engine, comprising: a first component; a second component positioned in proximity to the first component such that cavity is defined between the first and second components, a resilient seal disposed in the cavity so as to block gas flow between the first and second components, the resilient seal having a first contact surface contacting the first component and a second contact surface contacting the second component; and wherein a damping element is bonded to the resilient seal.

18. The sealing apparatus of any preceding clause wherein the damping element comprises an elastomer.

19. A sealing apparatus for a gas turbine engine, comprising: a first component; a second component positioned in proximity to the first component such that cavity is defined between the first and second components, a resilient seal disposed in the cavity so as to block gas flow between the first and second components, the resilient seal having a first contact surface contacting the first component and a second contact surface contacting the second component, wherein the resilient seal includes: a first component which forms an annular ring with at least one split and includes first circumferential corrugations; and a second component part which forms a closed annular ring and includes second circumferential corrugations; wherein the first and second circumferential corrugations are nested together.

20. A sealing apparatus for a gas turbine engine, comprising: a first annular component; a second annular component positioned in proximity to the first annular component such that cavity is defined between the first and second components, a resilient seal disposed in the cavity so as to block gas flow between the first and second components, the resilient seal having a first contact surface contacting the first component and a second contact surface contacting the second component, wherein the resilient seal separates the cavity into first and second cavity portions, and includes a plurality of bends defining first and second chambers, wherein the first chamber communicates with the first portion of the cavity, the second chamber communicates with the second cavity portion, the first and second chambers are isolated from each other, and the chambers are shaped such that, for each chamber, substantially equal surface areas are facing the opposite cavity portions.

21. The apparatus of any preceding clause wherein the resilient seal has a coil shape.

22. A sealing apparatus for a gas turbine engine, comprising: a first component; a second component positioned in proximity to the first component such that cavity is defined between the first and second components, a resilient seal disposed in the cavity so as to block gas flow between the first and second components, the resilient seal having a first contact surface contacting the first component and a second contact surface contacting the second component, wherein the resilient seal includes: a plurality of major bends defining two or more major legs interconnected by 180-degree bends; and a plurality of 180-degree minor bends within each major leg.

23. The apparatus of any preceding clause wherein the damping element is separate from the resilient seal and attached thereto by bonding.

24. The apparatus of any preceding clause wherein the damping element is connected to the seal at a location defining a greater than 90-degree bend in the resilient seal material.

What is claimed is:

1. An apparatus comprising:
a first curved end having a first contact surface contacting a first component of a gas turbine engine; and
a second curved end having a second contact surface contacting a second component of the gas turbine engine, the first contact surface and the second contact surface defining a seal, the seal disposed in a cavity formed by the first component and the second component, so as to block gas flow between the first and second components; and
at least five 180 degree bends separating the first contact surface from the second contact surface; and
at least six straight legs disposed between the first contact surface and the second contact surface, the at least six straight legs including:
a first leg of the at least six straight legs, the first leg connecting the first curved end to a first bend of the at least five 180 degree bends; and
a second leg of the at least six straight legs, the second leg connecting the first bend to a second bend of the at least five 180 degree bends, the first leg longer than the second leg.

2. The apparatus of claim 1, further including a damper coupled to the seal.

3. The apparatus of claim 2, wherein the damper is an elastomer O-ring.

4. The apparatus of claim 2, wherein the damper is disposed within an interior of a first bend of the at least five 180 degree bends.

5. The apparatus of claim 4, wherein the damper is a first damper, the interior is a first interior, and further including:
a second damper disposed within a second interior of a second bend of the at least five 180 degree bends; and
a third damper disposed within a third interior of a third bend of the at least five 180 degree bends.

6. The apparatus of claim 5, wherein the first bend, the second bend, and the third bend are radially adjacent.

7. The apparatus of claim 1, wherein the seal is an inner seal ring, and further including an outer seal ring.

8. The apparatus of claim 7, wherein a plurality of the at least five 180 degree bends define first corrugations and the outer seal ring includes second corrugations, the first corrugations radially adjacent to the second corrugations.

9. The apparatus of claim 8, wherein the first corrugations are nested within the second corrugations.

10. The apparatus of claim 7, wherein:
the inner seal ring defines a first annular ring, the first annular ring radially split at a first location; and
the outer seal ring defines a second annular ring.

11. The apparatus of claim 10, wherein the second annular ring is continuous.

12. An apparatus comprising:
a first curved end having a first contact surface contacting a first component of a gas turbine engine; and
a second curved end having a second contact surface contacting a second component of the gas turbine engine, the first contact surface and the second contact surface defining a seal, the seal disposed in a cavity formed by the first component and the second component, so as to block gas flow between the first and second components;
at least five 180 degree bends separating the first contact surface from the second contact surface; and
a damper coupled to the seal, wherein the damper is an elastomer U-ring.

13. The apparatus of claim 12, wherein the damper is disposed on an exterior of a first bend of the at least five 180 degree bends.

14. The apparatus of claim 13, wherein the damper is a first damper, the exterior is a first exterior, and further including a second damper disposed on a second exterior of a second bend of the at least five 180 degree bends.

15. A gas turbine engine including:
a first component;
a second component; and
a seal disposed in a cavity formed by the first component and the second component, so as to block gas flow between the first and second components, the seal including:
a first curved end having a first contact surface contacting the first component;
a second curved end having a second contact surface contacting the second component;
at least five 180 degree bends separating the first contact surface from the second contact surface;
at least six straight legs disposed between the first contact surface and the second contact surface, the at least six straight legs including:
a first leg of the at least six straight legs, the first leg connecting the first curved end to a first bend of the at least five 180 degree bends; and
a second leg of the at least six straight legs, the second leg connecting the first bend to a second bend of the at least five 180 degree bends, the first leg longer than the second leg.

16. The gas turbine engine of claim 15, wherein the seal is an inner seal ring, and further including an outer seal ring, a plurality of the at least five 180 degree bends define first corrugations and the outer seal ring includes second corrugations, the first corrugations radially adjacent to the second corrugations.

17. The gas turbine engine of claim 16, wherein the first corrugations are nested within the second corrugations.

18. The gas turbine engine of claim 16, wherein:
the inner seal ring defines a first annular ring, the first annular ring radially split at a first location; and
the outer seal ring defines a second annular ring.

* * * * *